(12) United States Patent
Stillman

(10) Patent No.: US 6,338,315 B1
(45) Date of Patent: Jan. 15, 2002

(54) LIVE FEEDER

(76) Inventor: Mark W. A. Stillman, 6483 W. 76th Ave., Arvada, CO (US) 80003

( * ) Notice: Subject to any disclaimer, the term of this patent is extended or adjusted under 35 U.S.C. 154(b) by 0 days.

(21) Appl. No.: 09/576,351

(22) Filed: May 22, 2000

(51) Int. Cl.[7] .................................................. A01K 5/00
(52) U.S. Cl. ...................................................... 119/51.01
(58) Field of Search ................................. 119/245, 501, 119/311, 246, 484, 453, 470, 427, 452, 51.01; 220/602; 43/107, 65

(56) References Cited

U.S. PATENT DOCUMENTS

| | | | | |
|---|---|---|---|---|
| 3,885,341 A | * | 5/1975 | Kuchenbecker et al. | ....... 43/65 |
| 4,938,169 A | * | 7/1990 | Barmakian | .................. 119/622 |
| 5,036,795 A | * | 8/1991 | Houghton | .................... 119/452 |
| 5,148,625 A | * | 9/1992 | Saleman | ....................... 43/121 |
| 5,544,621 A | | 8/1996 | Haurilesko | |
| 5,577,464 A | | 11/1996 | Wellington et al. | |
| 5,722,348 A | | 3/1998 | Phillips et al. | |
| 5,842,438 A | * | 12/1998 | Messmer | .................... 119/165 |
| 5,855,187 A | | 1/1999 | Tominaga | |
| 5,904,330 A | * | 5/1999 | Manico et al. | ........... 248/206.3 |

* cited by examiner

Primary Examiner—Charles T. Jordan
Assistant Examiner—Jordan Lofdahl
(74) Attorney, Agent, or Firm—Patent Trademark Services; Joseph H. McGlynn

(57) ABSTRACT

A feeder container for live insects which is made from transparent material, and the feeder container has mounting elements for mounting the feeder container on an enclosure for a pet. In addition, the feeder container has a self closing opening for capturing insects from the feeder container.

11 Claims, 1 Drawing Sheet

LIVE FEEDER

BACKGROUND OF THE INVENTION

This invention relates, in general, to a feeding device, and, in particular, to a feeding device that allows a pet to view and consume the contents of the feeder.

DESCRIPTION OF THE PRIOR ART

In the prior art various types of feeders have been proposed. For example, U.S. Pat. No. 5,544,621 to Haurilesko discloses a live insect feeder having an opening through which an insect can pass and a tacky substance encircling the opening on the outside of the container.

U.S. Pat. No. 5,577,464 to Wellington et al discloses an animal habitat with fixed and slidable windows for visibility and access.

U.S. Pat. No. 5,722,348 to Phillips et al discloses a pet housing mounted on a stand with a removable lid which is large enough for a human hand.

U.S. Pat. No. 5,855,187 to Tominaga discloses a breeding housing with a front opening transparent panel.

SUMMARY OF THE INVENTION

The present invention is directed to a feeder container for live insects which has a container made from transparent material, and the container has mounting elements for mounting the feeder in an enclosure for a pet. In addition, the feeder container has a self closing opening for a pet to access the insects.

It is an object of the present invention to provide a new and improved feeder contained for holding live insects.

It is an object of the present invention to provide a new and improved feeder contained for holding live insects which has a self closing opening for allowing a pet to retrieve live insects.

It is an object of the present invention to provide a new and improved feeder contained for holding live insects which is inexpensive to manufacture and easy to use.

These and other objects and advantages of the present invention will be fully apparent from the following description, when taken in connection with the annexed drawings.

DESCRIPTION OF THE PREFERRED EMBODIMENT

Figure 1:
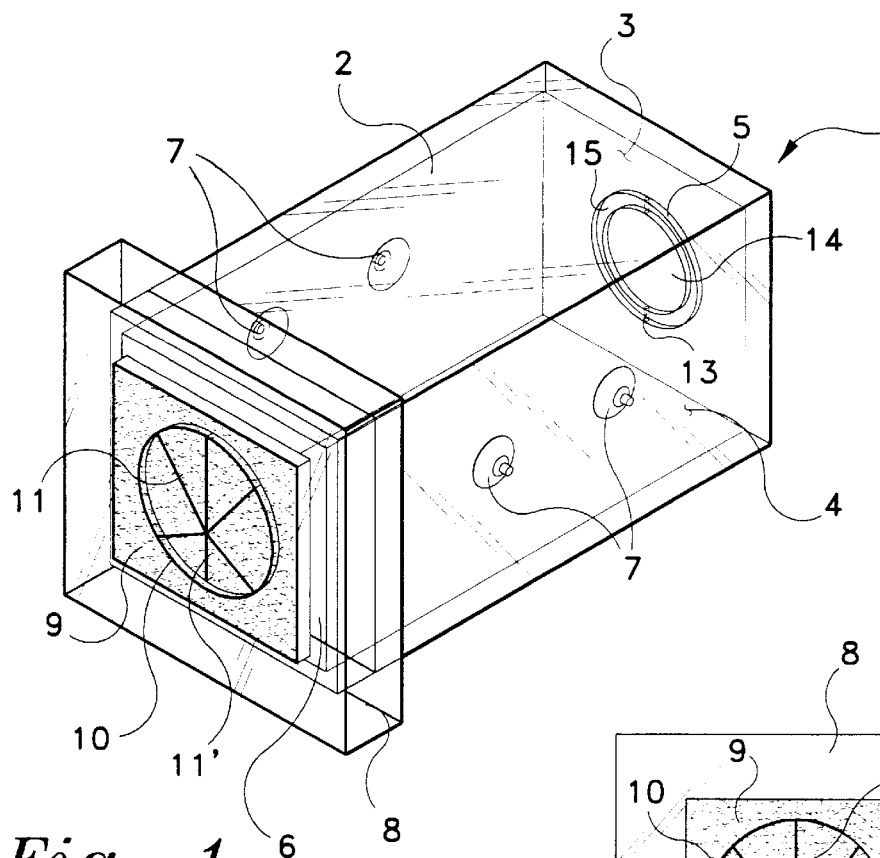
FIG. 1 is perspective view of the present invention.

Referring now to the drawings in greater detail, FIG. 1 shows the live feeder 1 of the present invention. The feeder is designed to be used to feed a pet which eats live insects. The feeder can be attached to a pet enclosure (not shown) by means of transparent suction cups 7. The feeder 1, as shown in FIG. 1, is made entirely of transparent materials so the pet can view and investigate the insects within the container.

Figure 2:
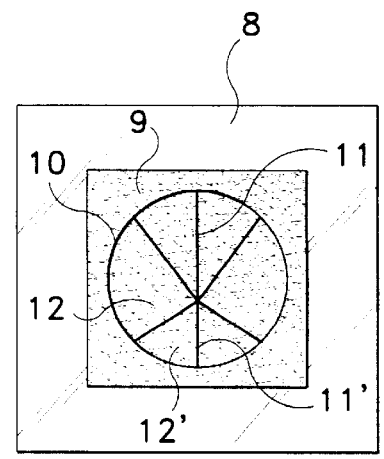
FIG. 2 is a front plan view of the cover used with the present invention.
Figure 3:
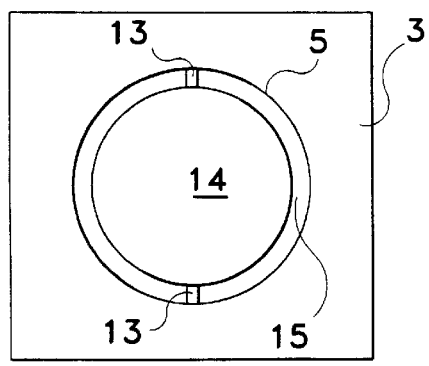
FIGS. 3 and 4 are plan views of the back wall of the present invention.
Figure 4:
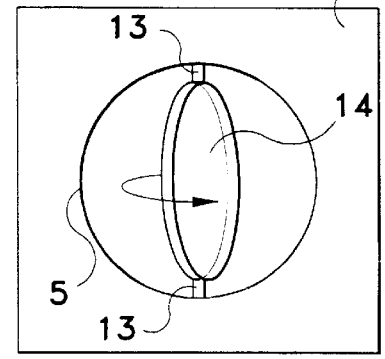

The container comprises a box having a top 2, sides 4, a back wall 3, a bottom 6, and an open front over which is placed a lid or cover 8, (see also FIG. 2). The clear suction cups 7 can be affixed to one or both of the side walls 4, or to the back 3 and will mount the feeder 1 to the inside of the pet enclosure (not shown). The back wall 3 has an opening 5, (also shown in FIGS. 3 and 4). The opening 5 has a disk 14 mounted in the opening by means of two acrylic pins 13. In order to mount a suction cup 7 in the back wall, the disk 14 will be twisted, as shown by the arrow in FIG. 4, until the pins 13 break and then the disk 14 can be removed. Once the disk 14 is removed, a suction cup 7, which has an outer circumference larger than the opening 5 can be friction fit within the opening 5. This same method can be used to also mount the suction cups 7 in the side walls 4.

If the disk 14 is not removed in order to mount a suction cup, the space 15 between the disk 14 an d the opening 5 will serve as a ventilation opening for th e in sects.

As shown in FIGS. 1 and 2, the open front wall of the feeder 1 is closed by a lid or cover 8 which is frictionally engaged over the open front of the feeder. The lid 8 is also made from a transparent material, so the pet's view of the contents of the feeder is not obstructed. The cover 8 has an opening which is covered by a clear, rubber square 9. The square can be attached to the cover 8 in any conventional manner. The rubber square 8 has a circular opening 10 for med therein by a plurality of slits 11, 11' which are cut into the rubber square 8 to form flaps 12. The slits 11, 11' will extend from the circumference of the circle 10 to a position below the center, so the points of the flaps 12 are free while the larger side of the flaps are still attached to the rubber square 9. In order to do this the slits 11' are shorter than the slits 11.

Positioning the point at which the flaps 12 will meet toward the bottom of the circle 10 creates a smaller flap 12' at the bottom ⅓ of the circle 10. The positioning of the flaps in this manner creates less resistance from the resilient flaps 12' at the bottom of the circle 10 since the flaps 12' will be smaller, and this will make it easier for the pet to capture the live insects.

In order to use the feeder 1 of the present invention, an owner will remove the feeder 1 from the pet enclosure by detaching the suction cups 7 from the pet enclosure. Then, he/she will grasp one of more live insects in their hand, remove lid 8 and release the insects inside the feeder. In order to remove live insects from the container, the pet can push their head through the flaps 12, 12'. Once their head is inside the feeder 1, the pet can capture the insects inside the feeder, and removed their head back through the flaps 12, 12'. Since the square 9 is made from rubber, the flaps will snap back into the position shown in FIG. 2, which will close the opening and keep other live insects inside the feeder 1 from escaping.

The owner can then reattach the feeder to the pet enclosure by means of the suction cups 7. In the alternative, the feeder 1 can be mounted in such a position within the pet enclosure that the entry flaps 12 will be easily accessed without removing the feeder 1 from the pet enclosure.

It should be noted that while the container, the cover 8 and the rubber 9 are shown to be square or rectangular, this is merely for illustrational purposes, and other shapes could be used without departing from the scope of the invention.

Although the Live Feeder and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A feeder container for holding live insects comprising:

a container having a top, bottom, sides and a front and back wall, said back wall having an opening therethrough, said front wall being open and covered with a lid, said lid having an opening therethrough and a covering over said opening, said covering being made from a resilient material and having a plurality of slits therethrough, said slits forming a plurality of resilient flaps for allowing a pet to capture live insects from the container.

2. The feeder container as claimed in claim 1, wherein said flaps are pie-shaped.

3. The feeder container as claimed in claim 1, wherein said container has means on at least one of said sides for detachably mounting said container within a pet enclosure.

4. The feeder container as claimed in claim 1, wherein said container has means on said back wall for permitting a mounting means to be secured in said back wall in order to mount said container within a pet enclosure.

5. The feeder container as claimed in claim 3, wherein said means is suction cups.

6. The feeder container as claimed in claim 1, wherein said container is made from a transparent material.

7. The feeder container as claimed in claim 1, wherein said resilient flaps are of different lengths.

8. The feeder container as claimed in claim 7, wherein smaller flaps are positioned toward a bottom of said opening in said lid and larger flaps are positioned toward a top of said opening in said lid.

9. A feeder container for holding live insects comprising:

a container having a top, bottom, sides and a front and back wall, said back wall having an opening therethrough, said front wall being open and covered with a lid, said lid having an opening therethrough and a covering over said opening, said covering being made from a resilient material and having a plurality of slits therethrough, said slits forming a plurality of resilient flaps for allowing a pet to capture live insects from the container, and wherein said container has means on said back wall for permitting a mounting means to be secured in said back wall in order to mount said container within a pet enclosure, and wherein said means on said back wall for permitting a mounting means to be secured in said back wall is an opening in said back wall, and said opening having a disk mounted within said opening.

10. The feeder container as claimed in claim 9, wherein said disk is mounted within said opening by means of at least one pin.

11. The feeder container as claimed in claim 9, wherein said at least one pin is breakable.

\* \* \* \* \*